United States Patent
Ben-Zvi et al.

(10) Patent No.: US 7,984,417 B2
(45) Date of Patent: Jul. 19, 2011

(54) META-MODEL INFORMATION ASSOCIATED WITH AN ENTERPRISE PORTAL

(75) Inventors: Elisha Ben-Zvi, Ra'anana (IL); Nimrod Barak, Ness Ziona (IL); Robert Krien, Beit Shearin (IL); Marina Razumovsky, Rosh Ha'ayin (IL)

(73) Assignee: SAP Portals Israel Ltd., Ra'anana (IL)

( * ) Notice: Subject to any disclaimer, the term of this patent is extended or adjusted under 35 U.S.C. 154(b) by 1054 days.

(21) Appl. No.: 11/771,000

(22) Filed: Jun. 29, 2007

(65) Prior Publication Data
US 2009/0007061 A1    Jan. 1, 2009

(51) Int. Cl.
*G06F 9/44* (2006.01)
(52) U.S. Cl. ........ 717/106; 717/104; 717/105; 717/113; 717/120; 717/122
(58) Field of Classification Search ............ 717/106
See application file for complete search history.

(56) References Cited

U.S. PATENT DOCUMENTS

| | | | |
|---|---|---|---|
| 6,985,939 B2* | 1/2006 | Fletcher et al. | 709/223 |
| 7,464,369 B1* | 12/2008 | Banerjee et al. | 717/106 |
| 2003/0177481 A1* | 9/2003 | Amaru et al. | 717/148 |
| 2006/0015594 A1* | 1/2006 | Kontamsetty et al. | 709/221 |
| 2006/0294496 A1* | 12/2006 | Smith et al. | 717/105 |
| 2007/0067712 A1* | 3/2007 | Baker et al. | 715/506 |
| 2008/0147797 A1* | 6/2008 | Ramaswamy et al. | 709/204 |

* cited by examiner

*Primary Examiner* — Thomas K Pham
(74) *Attorney, Agent, or Firm* — Buckley, Maschoff & Talwalkar LLC

(57) ABSTRACT

According to some embodiments, meta-model information associated with an enterprise portal is defined. The meta-model information may then be consumed (e.g., by a design tool) when not in communication with an executing enterprise portal server. According to some embodiments, the meta-model information includes UML class diagram definitions associated with the enterprise portal.

11 Claims, 10 Drawing Sheets

META-MODEL INFORMATION ASSOCIATED WITH AN ENTERPRISE PORTAL

FIELD

Some embodiments of the present invention may relate to business information enterprise systems. In particular, some embodiments may comprise systems and methods wherein meta-model information is associated with an enterprise portal.

BACKGROUND

A business information enterprise system may improve an organization's ability to monitor and/or manage data in a complex business environment. For example, such a system might store a large amount of business information, such as a yearly global sales plan and profit data on both a company-wide and regional basis. Different users may then access the information in different ways. For example, a business analyst might be interested in a normalized comparison of each year's sales plan figures as compared to other years. A human resources administrator might instead want to access a list of employee names located in a particular country. In general, many different types of data could be stored by, and accessed from, a business information enterprise system (e.g., inventory data, sales data, and/or accounting data) and different types of data can often be used in different ways.

In some cases, business information is accessed through a Web-based "portal" that can display information to, and interact with, users. For example, a user might view business reports and/or select a particular item within a report to obtain further information about that item. Note that a user or group of users might want to customize the way in which information is displayed and/or interacted with via the portal.

To help a user design a personalized portal that suits his or her needs, a portal design tool may store a pre-defined set of portal elements, such as portal templates and objects. The user could then arrange and further define the portal elements as required. Note that some or all of these portal elements may be associated with business logic. For example, a sales report template might be "built into" the portal design tool such that a user will always see a particular graph when an item in a sales report is selected. Similarly, a particular type of portal element might be permitted in certain display areas (e.g., a human resources area within a portal page) while another type of portal element is not permitted in those areas.

To accommodate this type of logic, the portal design tool might include rules and other information associated with portal templates and objects. The rules might include, for example, business logic (e.g., Java instructions on how certain business parameters should be calculated) and/or a set of user interface design rules (e.g., indicating how the tool should behave when a user drags or drops items within a portal layout).

Such an approach, however, can require that a substantial amount of information be included in the portal design tool. Moreover, there may be a number of different portal design tools, and the logic and rules associated with portal elements might need to be duplicated in all of them. That is, a first portal design tool used by a first user and a second design tool used by a second user would both need to store the rules and logic associated with the business enterprise portal. In addition, when a logic rule associated with the business is changed, the change might need to be reflected for a large number of portal design tools (e.g., every design tool might need to be updated to reflect that three separate business reports have now been combined into a single report). The administrative maintenance associated with this type of approach can be both time-consuming and error-prone.

Another disadvantage of typical approaches is that a portal design tool must interact with an executing portal server while a user is designing and/or validating a portal layout. In some cases, however, a user may want to design a business portal when an executing portal server is not currently available (e.g., when he or she is "off-line" with respect to the portal server).

Approaches that may improve a users ability to design business information portals could, therefore, be desirable. Moreover, it may advantageous to provide one or more tools that facilitate a users ability to do so even when an executing portal server is not available.

DETAILED DESCRIPTION

Figure 1:
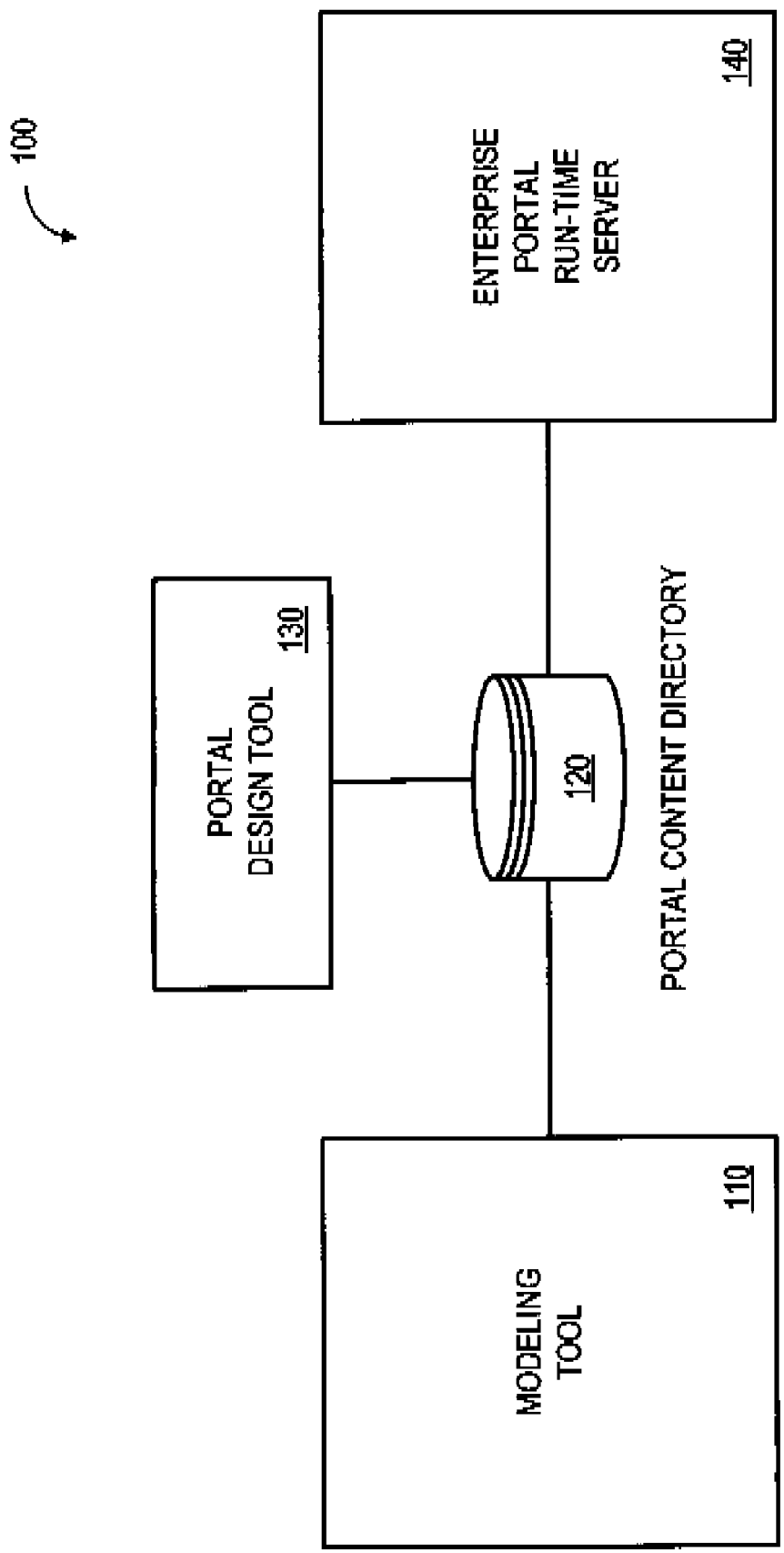
FIG. 1 is a block diagram of a system that may facilitate creation and delivery of a business enterprise portal according to some embodiments.

To alleviate problems inherent in the prior art, some embodiments of the present invention introduce systems, methods, computer program code, and means wherein meta-model information is associated with an enterprise portal. For example, FIG. 1 is a block diagram of a system 100 that may facilitate creation and delivery of a business enterprise portal according to some embodiments. The system 100 includes a modeling tool 110 that may be used to create meta-model information associated with business portals. As used herein, the phrase "meta-model information" may refer to, for example, information associated with an analysis, construction, and/or development of rules, constraints, and/or models applicable for a particular type of model.

The modeling tool 110 may store the meta-model information in, for example, a portal content directory 120. The modeling tool 110 and portal content directory 120 may exchange information via an interface (e.g., a local interface connection or a communication network interface). Note that elements described herein as communicating with one another may be directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP), and/or Wireless Application Protocol (WAP). Although a single modeling tool 110 is illustrated in FIG. 1, note that any number of modeling tools 110 may create and store meta-model information in the portal content directory 120. The portal content directory 120 may therefore act as a central, version-controlled repository for the meta-model information (such as the views, pages, systems, and/or transport packages associated with a model or meta-model).

According to some embodiments, a portal design tool 130 may access the information in the portal content directory 120. The design tool 130 might, for example, let a user or group of users define a particular portal layout for business information content. According to some embodiments, this portal design information may also be stored in the portal content directory 120. Note that because the portal content directory 120 may store meta-model information, the portal design tool 130 might not need to incorporate business logic information associated with the enterprise portal. That is, the business logic information may be "de-coupled" from the user interface associated with the portal design tool 130.

An enterprise portal run-time server 140 may also access information from the portal content directory 120. The server 140 might, for example, receive an HTTP portal request (e.g., including a Uniform Resource Locator (URL) address) from a user Web browser and access information from the portal content directory 120 to create a portal view that will be provided to the user. According to some embodiments, the server 140 might be associated with, for example, a portal run-time engine that is able to run portal components and respond with Hypertext Markup Language (HTML) information produced by the components.

Figure 2:
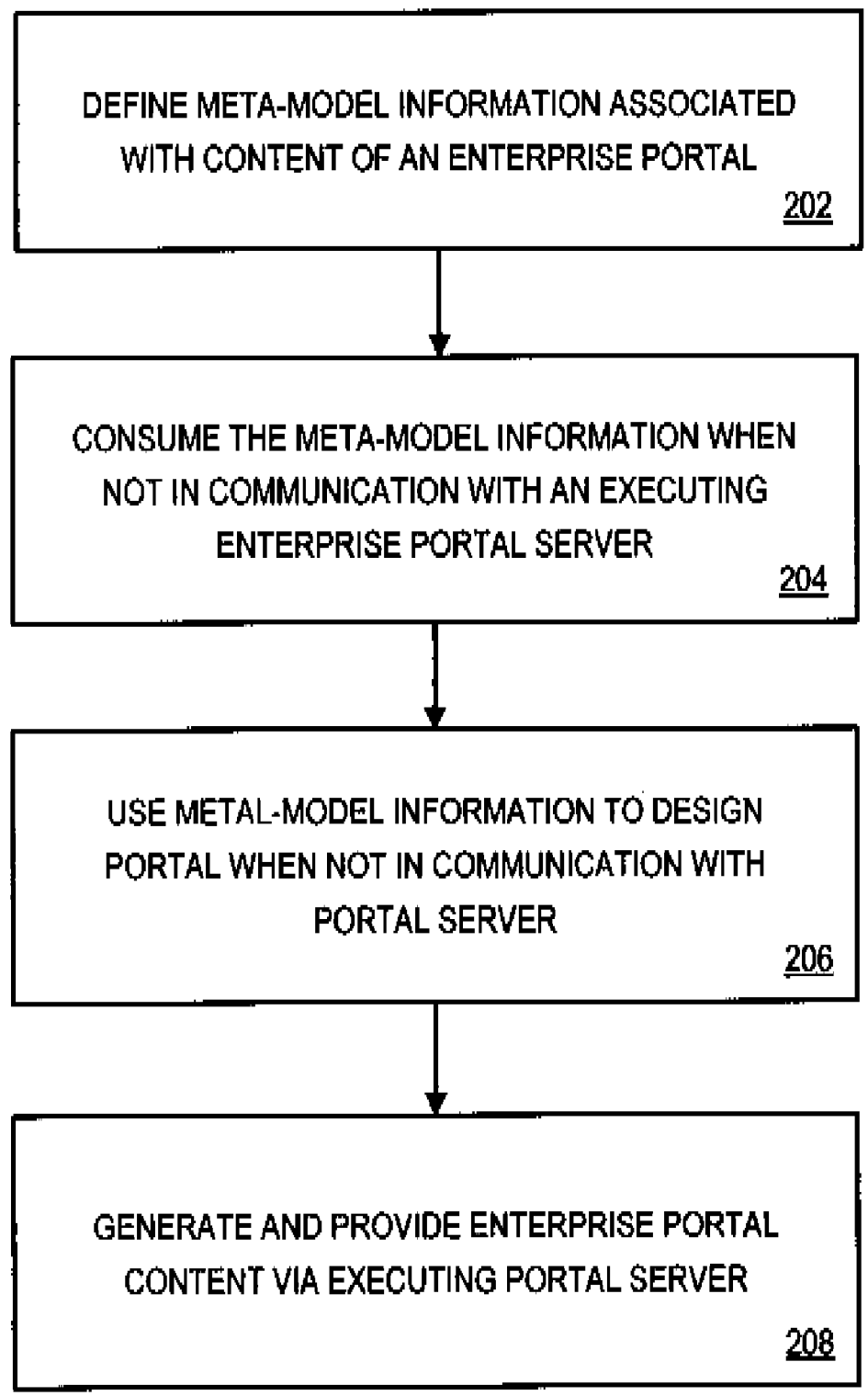
FIG. 2 is a flow diagram of portal creation process steps pursuant to some embodiments.

FIG. 2 is a flow diagram of process steps that might be associated with the system 100 of FIG. 1 pursuant to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, meta-model information associated with enterprise portal content may be defined. By way of example, the metal-model information might be defined via a Graphical User Interface (GUI) associated with the modeling tool 110 of FIG. 1. The portal content meta-model might be, for example, a set of Unified Modeling Language (UML) class diagram definitions holding the relations, attributes, and/or constraints of portal semantic objects which are independent of run-time or design-time environments.

At 204, the meta-model information may be consumed when not in communication with an executing enterprise portal server. For example, the portal design tool 130 of FIG. 1 might use the meta-model information at 206 even when the enterprise portal run-time server 140 is not executing.

At 208, enterprise portal content may be generated and provided (e.g., provided through a Web browser) via an executing enterprise portal server. For example, the enterprise portal run-time server 140 of FIG. 1 might use the design information in the portal content directory 120 to generate and provide an appropriate Web-page portal of business information to a user.

Thus, some embodiments of the present invention may provide an ability to create and edit portal content models without needing to have a live portal running. Moreover, embodiments may help ensure data consistency by validating created objects against definitions in the meta-model and help ensure that all content creation tools will use the same schemes when creating and modifying content.

Note that some or all of the devices illustrated in FIG. 1 (as well as the other systems described herein) may use processor-executable program code read from one or more of a computer-readable medium, such as a floppy disk, a CD-ROM, a DVD-ROM, a magnetic tape, and a signal encoding the process, and then stored in a compressed, uncompelled and/or encrypted format. Note that embodiments are not limited to any specific combination of hardware and software. Moreover, the devices described herein might, for example, support any of the protocols in the following non-exhaustive list: Java Database Connectivity (JDBC), Java Connector (JCO), P4, and Simple Object Access Protocol (SOAP). Moreover, the databases might comprise a relational database accessible via a Structured Query Language (SQL) interface and/or systems which provide intermediary "business intelligence" to data stored within the database.

The user interfaces, such as the modeling tool 110 and design tool 130 might execute at a workstation, Personal Computer, or a mobile wireless device, such as a laptop computer, a Personal Digital Assistant (PDA), a tablet computer, a handheld computer, or any other suitable devices that are or become known.

Figure 3:
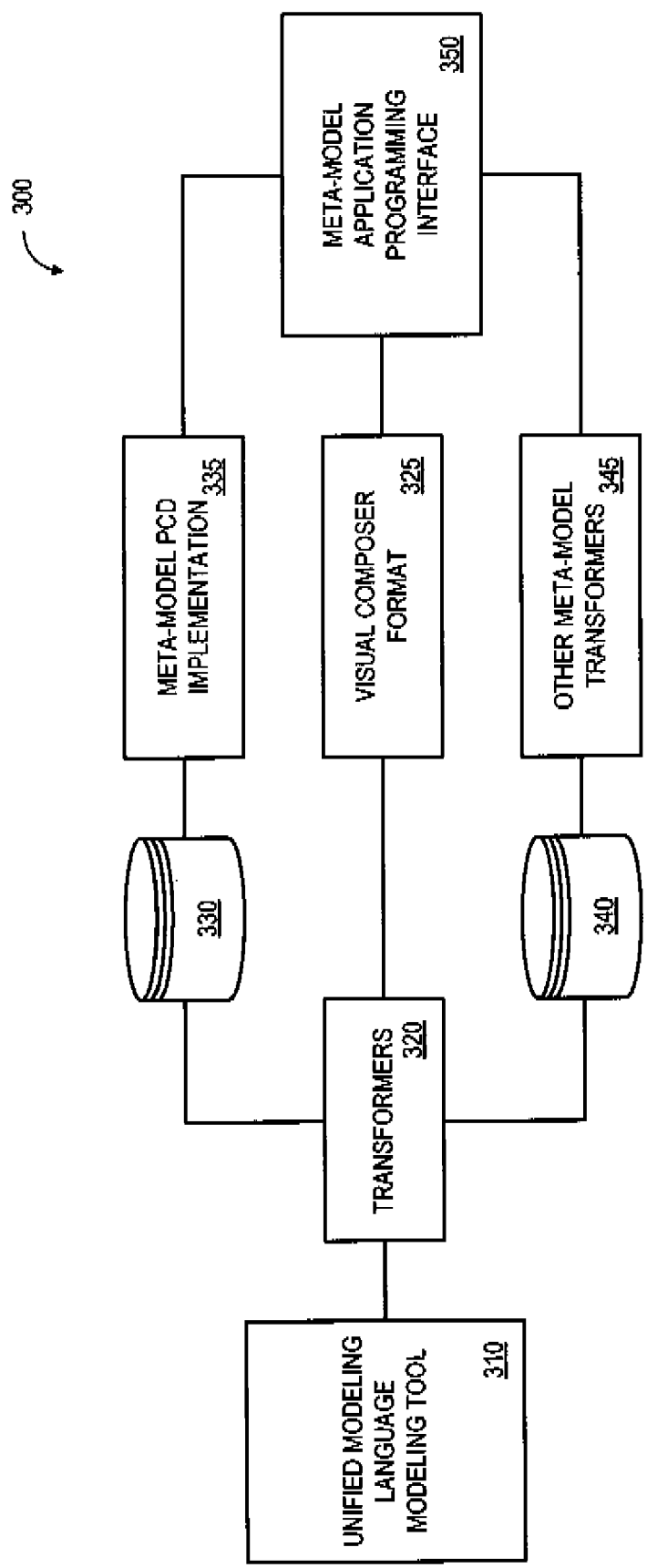
FIG. 3 is a more detailed data flow illustration associated with creation of enterprise portal content according to some embodiments.

FIG. 3 is a data flow 300 illustration associated with creation of enterprise portal content according to some embodiments. In particular, a UML modeling tool 310 may be associated with any standardized specification language for object modeling. According to some embodiments, the UML modeling tool 310 is associated with a general-purpose modeling language that includes a graphical notation used to create an abstract model of a system, referred to as a UML model. Moreover, the UML modeling tool 310 may be associated with business processing models as defined by the Object Management Group (OMG) and/or a Meta-Object Facility (MOF) meta-model.

The UML modeling tool 310 may export information associated with, for example, Extensible Markup Language (XML) Metadata Interchange (XMI) information. The use of XMI information, may, for example, enable interchange of metadata between UML-based modeling tools and MOF-based metadata repositories in distributed heterogeneous environments. The XMI information may also be used as the medium by which models are passed from modeling tools to software generation tools. According to some embodiments, the UML modeling tool 310 might be associated with, by way of example only, the Rational Rose software application or any other modeling tool that creates UML and generates XMI information. Note that, in cases where UML might not be appropriate, complex constraints might instead be defined using an Object Constraint Language (OCL) information.

The UML modeling tool 310 might, for example, provide information to one or more transformers 320. According to some embodiments, the transformers 320 might provide, for example Generic Creator (GC) script to one or more databases or repositories 330, 340, such as a portal content directory. Some of the elements of FIG. 3 discussed herein may be associated with, for example, "design time" or "run time" environments of the portal system.

According to some embodiments, a visual composer format 325 data might directly provide information to a meta-model Application Programming Interface (API) 350. In other cases, a meta-model portal content directory implementation 335 might receive information from a meta-model repository 330 and provide information to the meta-model API 350. In some cases, other meta-model transformers 345 may receive information from a centralized modeling infrastructure database 340 and provide information to the meta-model API 350 (e.g., such an approach might be associated with translation data, Java code, and/or common Java interfaces).

In this way, the data flow 300 may provide portal semantics and templates along with the attributes (e.g., a name, description, and/or creator) and meta-attributes (e.g., whether data is a string, Integer, or array) of entities. According to some embodiments, the attribute information may be layered and/or categorized. In addition, the data flow 300 may provide relation information (roles, cardinality, constraints), an ability to instantiate objects, information about existing objects, and/or extensions of a basic model ("scenarios"). Note that because the data flow 300 can define scenarios for portal content creation in design-time tools (e.g., sets of objects, templates, and/or relations that extends and/or adds constraints on a basic scenario), content creation may be provided using off-line tools. Moreover, a generic API for content creation may be provided and may enable creation of content without direct reference to content types and provide a common modeling infrastructure (e.g., by providing generic tools for all content types without each object type needing its own transport handler). According to some embodiments, the transformers 420 may include a meta-model XMI implementation and/or may use the same API as is associated with the meta-model API 450.

Note that some embodiments may provide exposure and distribution of is the meta-model using the API with different implementations for J2EE based, standalone, and/or IDE based approaches. Moreover, as described herein, a system 300 such as the one illustrated in FIG. 3 might provide transformations of a meta-model into several different formats.

According to some embodiments, meta-model information can be defined and/or generated (e.g., including information about a set of modeling items and relationships between the modeling items) using any modeling tool. According to some embodiments, the meta-model information is associated with UML models and/or "diagrams." As used herein, a "diagram" may refer to, for example, a partial graphical representation of a portal content model.

Embodiments might be associated with, for example, a functional model (associated with the functionality of the system from the users point of view), an object model (associated with the structure and substructure of the system using objects, attributes, operations, and relationships), and/or a dynamic model (associated with the internal behavior of the system). Examples of models and diagrams might include, for example, structure diagrams, class diagrams, component diagrams, composite structure diagrams, deployment diagrams, object diagrams, package diagrams, behavior diagrams, activity diagrams, state machine diagrams, use case diagrams, interaction diagrams, communication diagrams, sequence diagrams, and/or timing diagrams.

The model and meta-model information might include, for example, relations, inheritances, and/or semantics creation. According to some embodiments, some or all of this information may be exported and saved to a persistency database, such as one associated with a portal content directory or file system. As used herein, a "persistency database" may refer to, for example, a database having the ability to retain data structures between program executions. This might be achieved, for example, by storing the data in non-volatile storage such as a file system or a relational database or an object database. One example of persistence is using Java serialization to store Java objects on disk or using Java to store enterprise Java information in a relational database.

According to some embodiments, an API exposes the information in a persistency database, The API may expose information, for example, during run-time. According to some embodiments, the API also exposes persistency data when needed at design-time, build-time, and/or deploy-time. Moreover, the same API might be implemented over different repositories to help ensure that applications using the API will not need to change according to the persistency layer. As used herein, an API may refer to, for example, a source code interface that a computer system or program library provides to support requests for services to be made of it by a computer program. An API may, for example, be specified in terms of a programming language that can be compiled when an application is built and may represent a coherent interface consisting of several classes or several sets of related functions or procedures.

Figure 4:
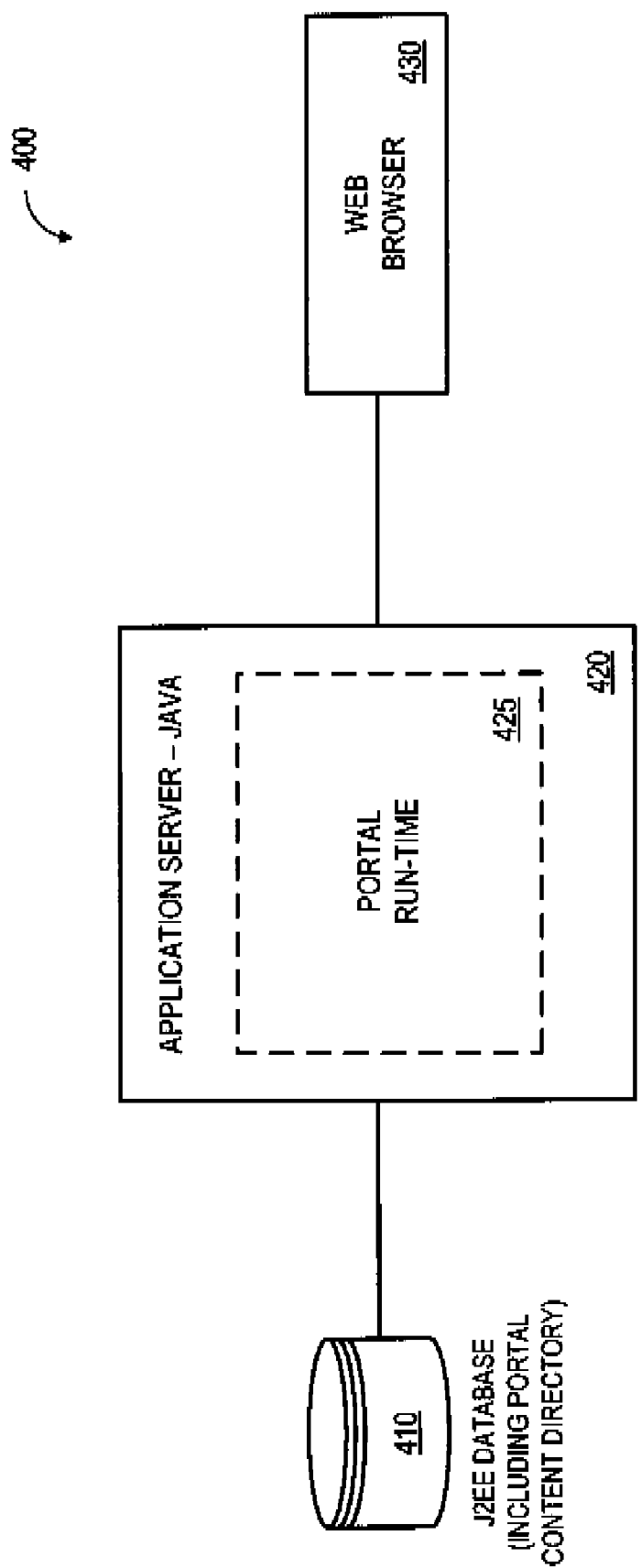
FIG. 4 is a block diagram of an enterprise portal architecture according to some embodiments.

FIG. 4 is a block diagram of an enterprise portal architecture 400 according to some embodiments. The architecture 400 includes a Java application server 420 that accesses a Java Platform Enterprise Edition (J2EE) database 410 with a portal content directory. The application server 420 may, for so example, be a programming platform for developing and running distributed multi-tier architecture applications, and may be based on modular software components running on the application server 420. The application server 420 may include, for example, a portal run-time 425 that lets a developer create an enterprise portal that is portable between platforms and scalable, while integrating with legacy technologies. According to some embodiments, the application server 420 handles the transactions, security, scalability, concurrency and management of the components that are deployed to it. Thus, when a Web browser 430 requests a particular portal page, the application server 420 and executing portal run-time 425 can access information in the J2EE database 410 to retrieve and provide the appropriate content.

Figure 5:
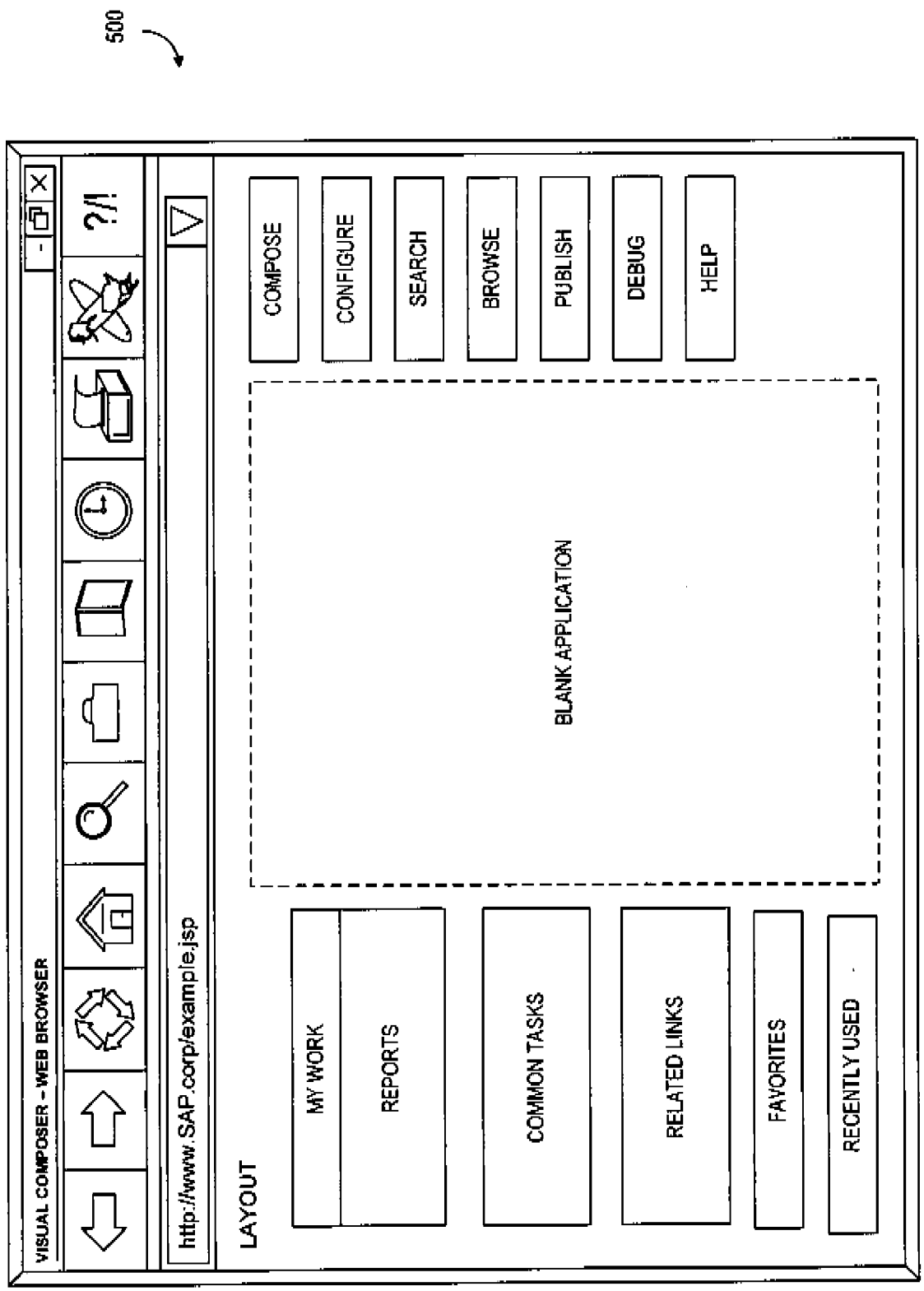
FIG. 5 is an enterprise portal work environment layout display according to some embodiments.

FIG. 5 is an enterprise portal work environment layout display 500 according to some embodiments. The layout display 500 might, for example, be used by a business analyst to define a layout for his or her customized enterprise portal. According to some embodiments, the layout display 500 is associated with the SAP™ Visual Composer tool that facilitates the creation of content for a business portal using modeling capabilities and a visual User Interface (UI) rather than manually writing code. Such an approach may provide tools for creating portal views that process data from back-end systems, including local and third-party enterprise systems. According to some embodiments, the layout display 500 is a Web-based application that lets users (or sets of users) build or customize pages and portal views as needed.

The portal layout display 500 may, for example, let a user "compose" portal information using a shape selector (e.g., tabs, views, and/or trees), general elements (e.g., portal views, groups, and/or links), pattern elements, layout patterns (e.g., two side-by-side areas or one above another), containers (panels, tab strips, and wizards), and/or interactors (e.g., form, grid, tile, list, chart, tree, HTML, and/or nested views). Other functions available via the portal layout display 500 might include the ability to search and browse for information, to publish portal information, and/or to debug potential portal information. The portal information defined by a user could include, by way of example only, common tasks, related links, favorites, recently used information, his or her work reports, and/or a blank application yet to be fully defined by the user. Such a so display may let a user combine portal components and provide a "what you see is what you get" UI.

Figure 6:
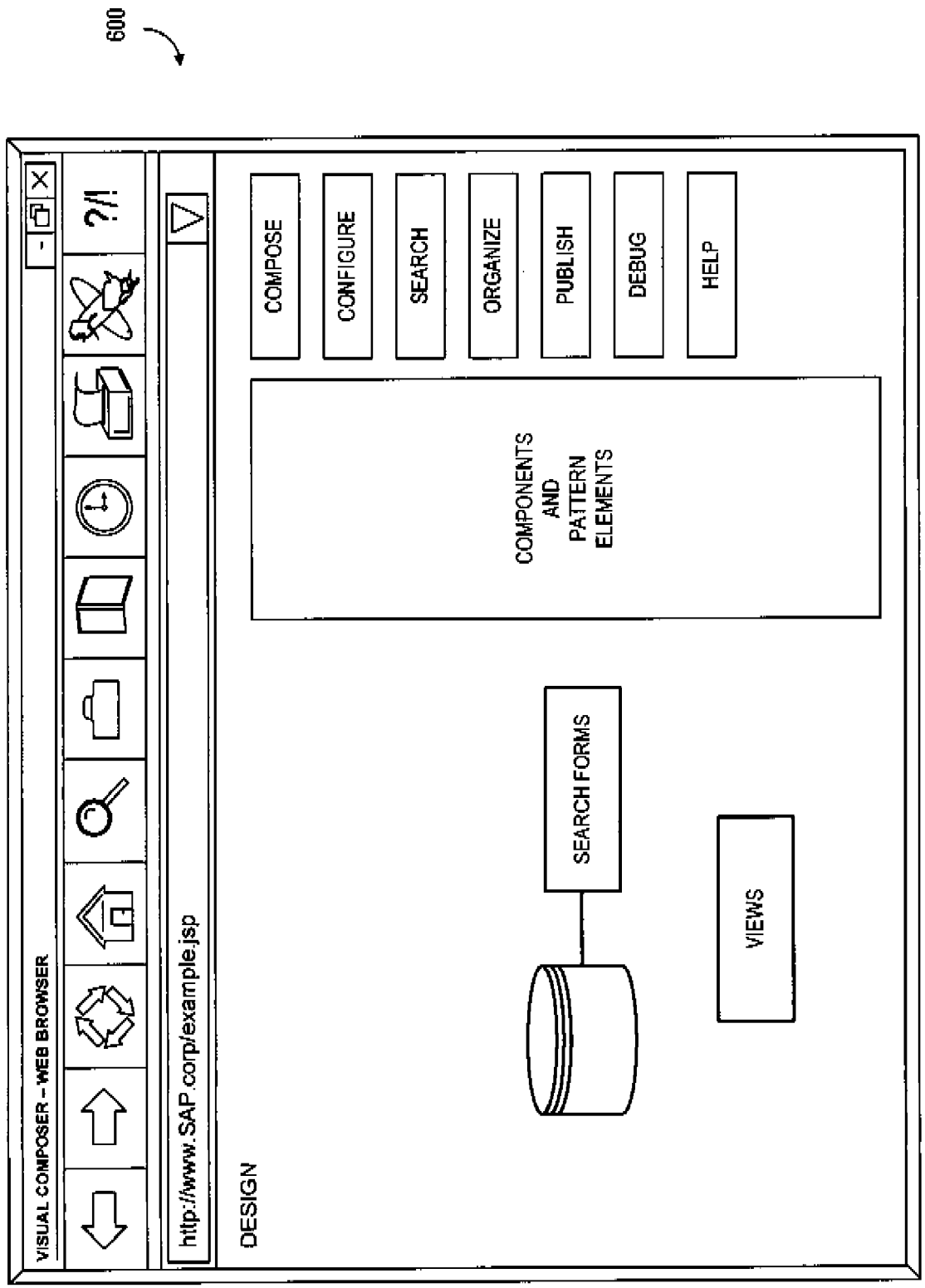
FIG. 6 is an enterprise portal application modeling design display according to some embodiments.

FIG. 6 is an enterprise portal application modeling design display 600 according to some embodiments. Such a display 600 might, for example, let a user define portal content that was laid out in connection with the display of FIG. 5. The design display 600 might, for example, let a user compose information by allowing him or her to perform freestyle or pattern modeling of a new portal component (e.g., a scenario, service, process, or module) or pattern element. The design display 600 might also let a user configure, organize, and search information, publish portal content and/or debug information being defined by the user. Note that content defined by the displays 500, 600 might be provided to different run-time application to render results (e.g., Flex or Ajax applications). Moreover, the abilities provided via the displays 500, 600 might let portal objects and visual composer components be re-used to improve the efficiency of the portal design process.

Figure 7:
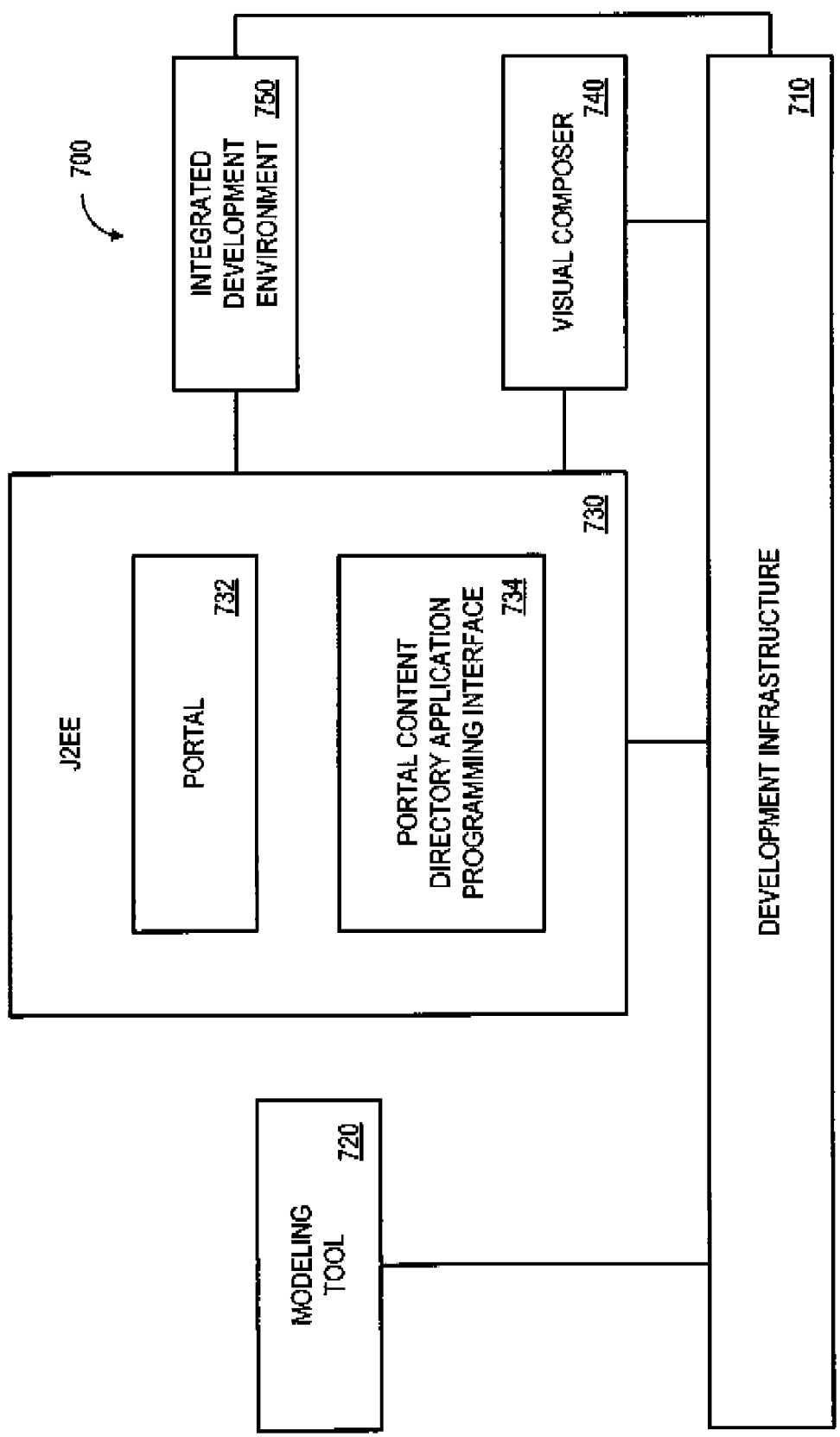
FIG. 7 illustrates a data flow diagram associated with creation of enterprise portal content according to some embodiments.

FIG. 7 illustrates a data flow diagram 700 associated with creation of enterprise portal content according to some embodiments. As before, a modeling tool 720 may be used to create meta-model information associated with an enterprise portal. The modeling tool 720 might be, for example, a UML tool adapted to output XMI information to a Development Infrastructure (DI) 710. According to some embodiments, the DI 710 may be a storage device that facilitates an exchange of documents compliant to the UML standard (e.g., UML models) between different software tools. The DI 710 may comprise, for example, a set of tools to help enable source control, project build packaging and/or transport.

A J2EE server 730 may also store information into and retrieve information from the DI 710 and may include a portal 732 engine and administrative tools, semantics, and/or profile information. The J2EE server may further include a portal content meta-model API 734 to facilitate an exchange of information with other devices and applications.

The flow diagram 700 further illustrates a visual composer 740 that can be used to design an enterprise portal. The visual composer 740 may include, for example, a portal kit that can exchange information with the DI 710 and/or the J2EE server 730. The portal kit might support, for example, generic portal rules, browse/search functions, and/or portal creation abilities.

According to some embodiments, an Integrated Development Environment (IDE) 750 may also interact with the DI 710 and J2EE server 730 to let a user design an enterprise portal. The IDE 750 may, for example, include software such as a source code editor, a compiler and/or interpreter, build-automation tools, and/or a debugger. According to some embodiments, a version control system and various tools to simplify the construction of a GUI are integrated in the IDE 750 as well. Note that the IDE 750 may also integrate a class browser, an object inspector, and/or a class hierarchy diagram for use with object oriented software development.

According to some embodiments, the IDE 750 includes one or more portal plug-ins (e.g., including template creation tools, model information, and/or meta-model information) that can exchange information with the DI 710. In this way, a user may be design an enterprise portal with the IDE even when the J2EE server 730 is not currently running or is otherwise unavailable.

Figure 8:
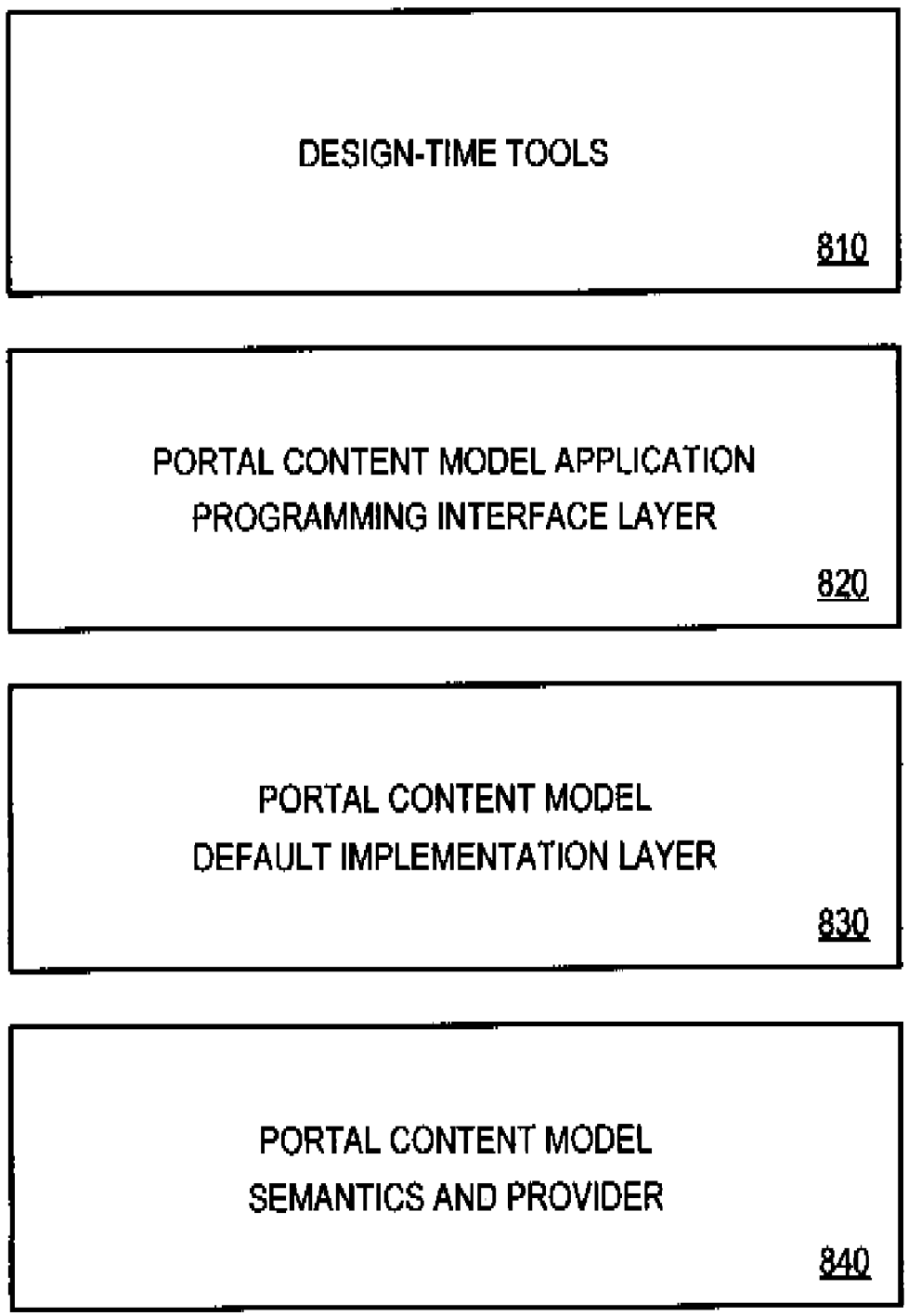
FIG. 8 is a block diagram of internal layers implementing application programming interfaces at a server according to some embodiments.

FIG. 8 is a block diagram of internal layers at a server according to some embodiments. In particular, design time tools (such as visual composer tools or generic portal content administration and creation tools) may be formed on a portal content model API layer 820 that includes a meta-data API and/or an administrative API. The portal content model API layer 820 may, for example, exchange information with the design-time tools 810 using Java Naming and Directory Interface (JNDI) look-ups.

Moreover, a portal content model default implementation layer 830 may be associated with a portal content directory and/or portal content model extensions may rest on portal content model semantics (e.g., associated with objects such as views, pages, or roles and meta-data exposure) and provider meta-data and/or object layer 840. Note that the same API might be used as the off-line tool and other design tools.

Figure 9:
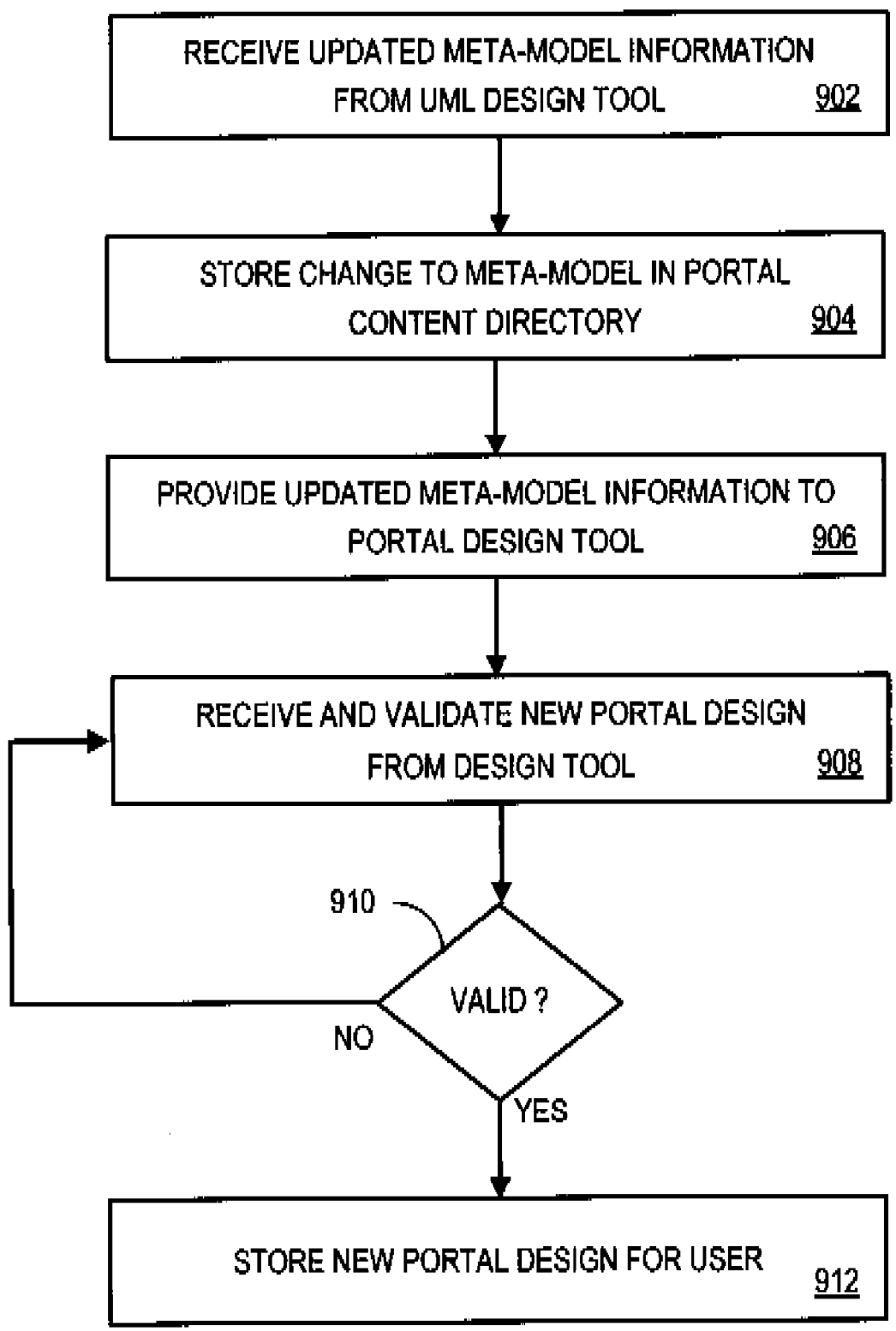
FIG. 9 is a flow diagram of portal content creation process steps pursuant to some embodiments.

FIG. 9 is a flow diagram of portal content creation process steps pursuant to some embodiments. At 902, updated meta-model information associated with an enterprise portal is received. The meta-model information may be associated with, for example, a UML model. At 904, the change to the meta-model information is stored in a portal content directory (e.g., a central database).

At 906, the updated meta-model information is provided to a portal design tool (e.g., via an API), such as a visual composer or IDE design tool that has been executed by a user. In this way, the design tool will receive the most up-to-date, enterprise-wide information about the model. Moreover, multiple design tool that need the same meta-model information will be sure to receive the same version of the data.

At 908, a new portal design may be received from a user and validated. If the new design is not valid at 910, another design may again be received at 908. If the new design is valid at 910, the new portal design is stored at 912. The new portal design can then be accessed (e.g., via an API) as required to render an appropriate portal display. As a result, the method of FIG. 9 can provide an ability to create valid portal content to be consumed by offline design-time tools (e.g., tools that are not connected to a running portal). Moreover, content creation can be enabled in a generic way independent of content nature and/or implementation and content creation can be performed from multiple design-time tools without needing to copy business logic to each of the tools. As a result, complexity dependencies may be reduced between portal applications in run-time and design-time environments. Also note that an addition of a new, related item type will be reflected automatically in the design tool UI and that changing and/or adding attributes may not change the design too UI code at all.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Figure 10:
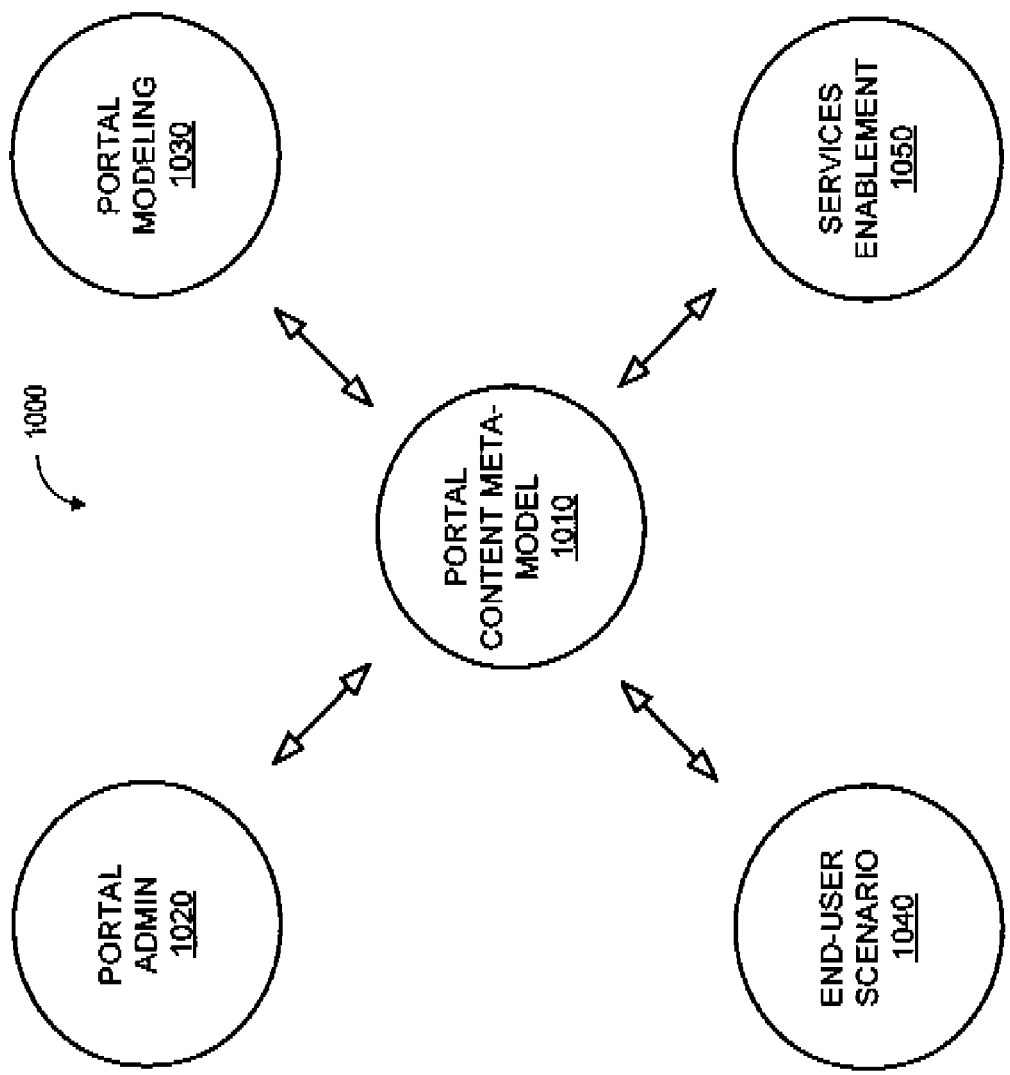
FIG. 10 illustrates portal content model meta-modal usages according to some embodiments.

For example, although embodiments have been described as using the meta-model information in particular ways, note that the meta-model information may be consumed in connection with any number of other services or tasks. For example, the portal content meta-model may support additional technology for content creation and management tools as shown in FIG. 10 which illustrates portal content model meta-modal usages 1000 according to some embodiments. In particular, a portal content meta-model 1010 might provide portal administration 1020 functions, such as generic administrator user interfaces, semantics creation, and/or administrative tools. Moreover, portal modeling 1030 might be associated with portal kits, content generation, and/or content re-use associated with a business enterprise system. Similarly, an end-user scenario 1040 might provide end-user content creation and/or personalization while services enablement 1050 could facilitate semantics service and/or services meta-data.

The several embodiments described herein are solely for the purpose of illustration. Persons skilled in the art will recognize from this description other embodiments may be practiced with modifications and alterations limited only by the claims.

What is claimed is:

1. A method associated with a business enterprise portal, comprising:
   defining meta-model information associated with the enterprise portal, the meta-model information being associated with unified modeling language class diagram definitions associated with the enterprise portal;
   consuming, by an off-line portal design tool, the meta-model information when not in communication with an executing enterprise portal server;
   connecting with an executing enterprise portal server; and
   generating, using layout information generated with the off-line portal design tool, portal content via the executing enterprise portal server, wherein a plurality of user interface portal design tools may consume the meta-model information and a change to the meta-model information associated with business logic does not require a change to any of the user interface portal design tools.

2. The method of claim 1, wherein the meta-model information is further associated with other modeling diagram definitions associated with the enterprise portal.

3. The method of claim 1, wherein said consuming is associated with an application programming interface.

4. The method of claim 1, wherein the meta-model information is associated with at least one of: portal semantic object relations; portal semantic object attributes; portal semantic object constraints; available object types; object templates; relations between objects; relations between attributes; or attribute categorization.

5. The method of claim 4, wherein at least one portal semantic object is independent of run-time and design-time environments.

6. The method of claim 1, wherein said connecting is associated with a generic application programming interface.

7. The method of claim 1, further comprising:
   validating at least one created object against a definition in the meta-model information.

8. A system, comprising:
   a meta-model tool to define meta-model information associated with a Web portal and to store the meta-model information in a portal content directory, the meta-model information being associated with unified modeling language class diagram definitions associated with the enterprise portal;
   a first application programming interface to expose the metal-model information in the portal content directory;
   a portal design user interface to access the first application programming interface and to facilitate definition, by a user, of a portal layout; and
   an enterprise portal run-time server to access a second application programming interface and to provide portal information to a Web browser in accordance with the defined portal layout, wherein the portal design user interface facilitates definition of the portal layout when not in communication with enterprise portal server.

9. A non-transitory computer-readable medium storing processor-executable process steps associated with a business information portal, the process steps comprising:
   defining unified modeling language meta-model information associated with the business information portal, the meta-model information being associated with unified modeling language class diagram definitions associated with the enterprise portal;
   consuming, by an off-line portal design tool, the meta-model information when not in communication with an executing enterprise portal server;
   connecting with an executing enterprise portal server; and
   generating, using layout information generated with the off-line portal design tool, portal content via the executing enterprise portal server, wherein a plurality of user interface portal design tools may consume the meta-model information and a change to the meta-model information associated with business logic does not require a change to any of the user interface portal design tools.

10. The computer-readable medium of claim 9, wherein said consuming is associated with a first application programming interface.

11. The computer-readable medium of claim 9, wherein said connecting with the executing enterprise portal server is associated with a second application programming interface.

* * * * *